(12) United States Patent
Karlsson et al.

(10) Patent No.: US 9,071,087 B2
(45) Date of Patent: Jun. 30, 2015

(54) ELECTRIC DRIVE DEVICE FOR MOTOR VEHICLE

(75) Inventors: Pontus Karlsson, Bromma (SE); Oskar Prinsback, Järved (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 253 days.

(21) Appl. No.: 13/696,059

(22) PCT Filed: Jul. 12, 2011

(86) PCT No.: PCT/SE2011/050947
§ 371 (c)(1),
(2), (4) Date: Jan. 4, 2013

(87) PCT Pub. No.: WO2012/008911
PCT Pub. Date: Jan. 19, 2012

(65) Prior Publication Data
US 2013/0200737 A1    Aug. 8, 2013

(30) Foreign Application Priority Data
Jul. 16, 2010    (SE) ........................................ 1050807

(51) Int. Cl.
*H02K 5/04*    (2006.01)
*B60K 7/00*    (2006.01)
(Continued)

(52) U.S. Cl.
CPC .............. *H02K 5/04* (2013.01); *B60K 7/0007* (2013.01); *B60K 17/043* (2013.01); *B60K 17/046* (2013.01); *H02K 5/20* (2013.01); *H02K 5/225* (2013.01); *H02K 7/116* (2013.01)

(58) Field of Classification Search
CPC ............ H02K 5/00; H02K 7/063; H02K 5/04
USPC .................. 310/89, 98–99; 417/410.3, 423.14
See application file for complete search history.

(56) References Cited

U.S. PATENT DOCUMENTS 4,543,047 A * 9/1985 Hasegawa ........................ 418/63
4,594,056 A * 6/1986 Brunner ......................... 417/271
(Continued)

FOREIGN PATENT DOCUMENTS

CN    101208217 A    6/2008
DE    19840006 A1    2/2000
(Continued)

OTHER PUBLICATIONS

International Search Report and Written Opinion received for PCT Patent Application No. PCT/SE2011/050947, mailed on Nov. 8, 2011, 11 pages.
(Continued)

*Primary Examiner* — Thanh Lam
(74) *Attorney, Agent, or Firm* — Morrison & Foerster LLP

(57) ABSTRACT

The invention relates to an electric drive device (10; 110; 210; 310; 410) comprising an electric motor (20) with a stator (24) and a rotor (22) arranged to rotate a drive shaft (26), a housing (30; 130; 230; 330; 430) in which the electric motor (20) is housed, which housing has an essentially ring shaped cross section with an imaginary center axle (X), wherein the electric motor (20) is eccentrically arranged in the housing (30; 130; 230; 330; 430) in such a way that the rotational center of the drive shaft (26) of the electric motor (20) runs essentially parallel to and at a distance from the center axle of the housing (30; 130; 230; 330; 430) so as to form a desired space (36) between the electric motor and said housing. The invention also relates to motor vehicle with an electric drive device.

13 Claims, 3 Drawing Sheets

(51) Int. Cl.
   *B60K 17/04*    (2006.01)
   *H02K 5/20*    (2006.01)
   *H02K 5/22*    (2006.01)
   *H02K 7/116*   (2006.01)

(56) References Cited

U.S. PATENT DOCUMENTS

| | | | |
|---|---|---|---|
| 5,250,863 | A | 10/1993 | Brandt |
| 6,533,558 | B1 * | 3/2003 | Matsumoto et al. ........ 417/410.3 |
| 6,881,041 | B2 * | 4/2005 | Lee ............................... 417/356 |
| 7,563,080 | B2 * | 7/2009 | Masuda ..................... 417/410.3 |
| 7,942,651 | B2 * | 5/2011 | Bin-Nun et al. ............. 417/415 |
| 8,083,500 | B1 * | 12/2011 | Lebkuchner et al. .... 417/423.12 |
| 8,398,377 | B2 * | 3/2013 | Itabashi et al. ............... 417/44.1 |
| 2007/0041852 | A1 * | 2/2007 | Masuda ..................... 417/410.3 |
| 2007/0117669 | A1 | 5/2007 | Garnett et al. |
| 2007/0201994 | A1 * | 8/2007 | Itani .......................... 417/423.3 |

FOREIGN PATENT DOCUMENTS

| | | | |
|---|---|---|---|
| EP | 0531267 | A2 | 3/1993 |
| SE | 467752 | B | 9/1992 |

OTHER PUBLICATIONS

Written Opinion received for Singapore Patent Application No. 201208110-5, mailed on Mar. 4, 2014, 5 pages.

Office Action Received for Australian Patent Application No. 2011279771, mailed on Apr. 23, 2014, 3 pages.

Office Action received for Chinese Patent Application No. 201180025085.3, mailed on Nov. 27, 2014, 14 pages (7 pages of English Translation and 7 pages of Official Copy).

* cited by examiner

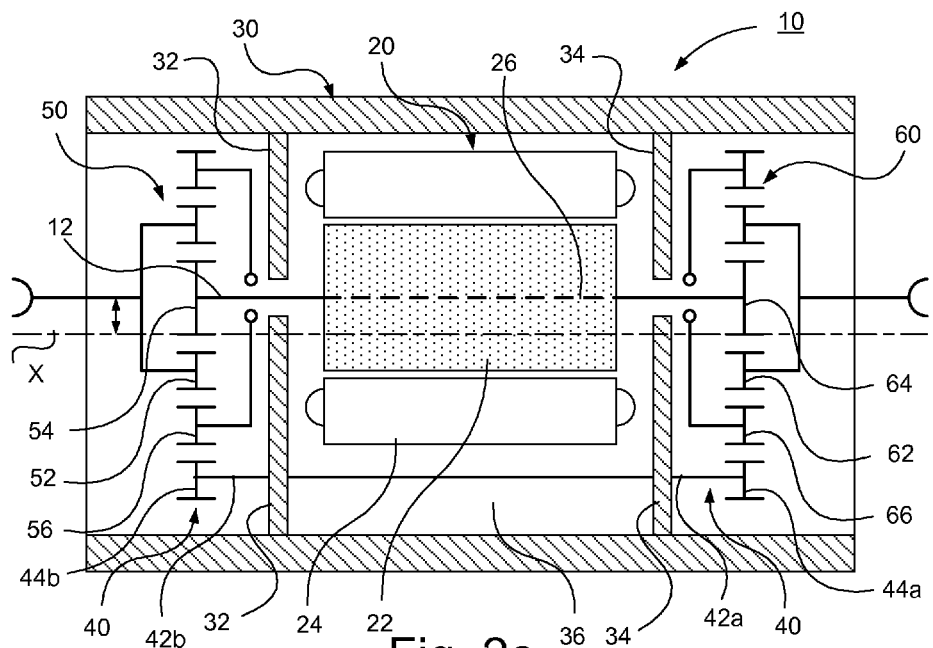
Fig. 2a
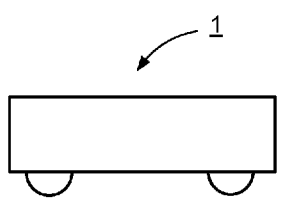
Fig. 1
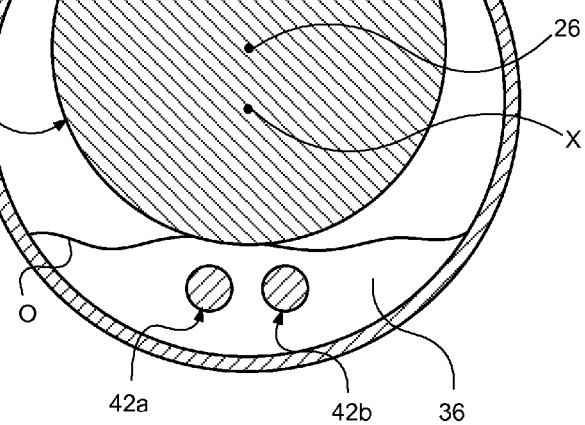
Fig. 2b
Fig. 3

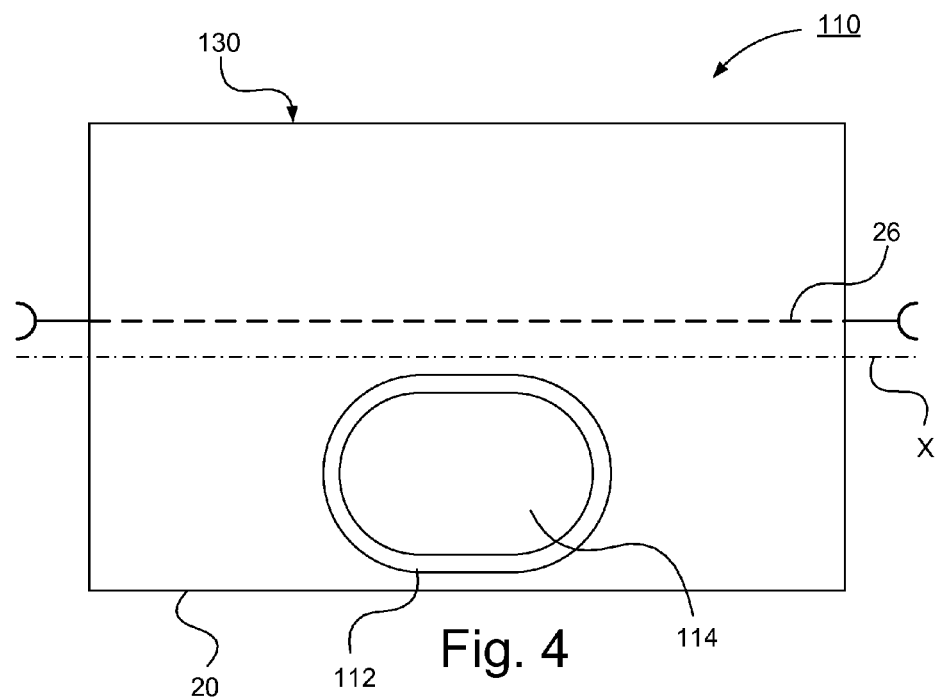
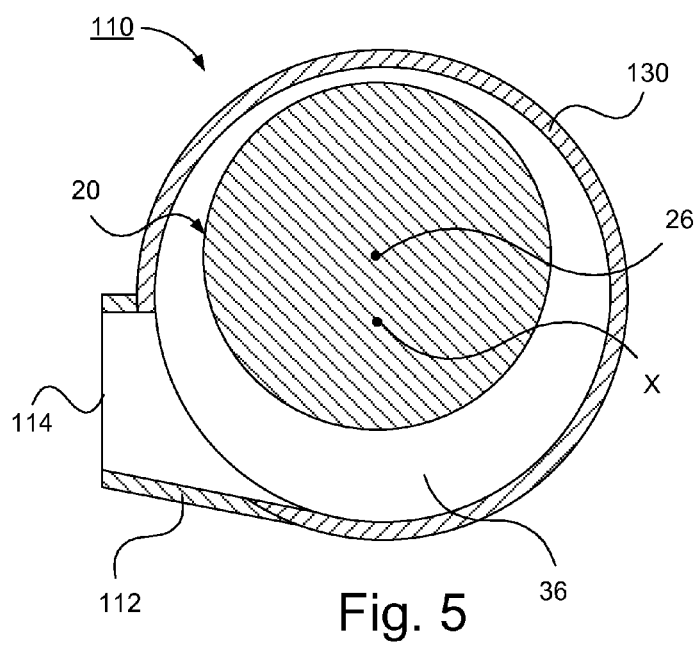

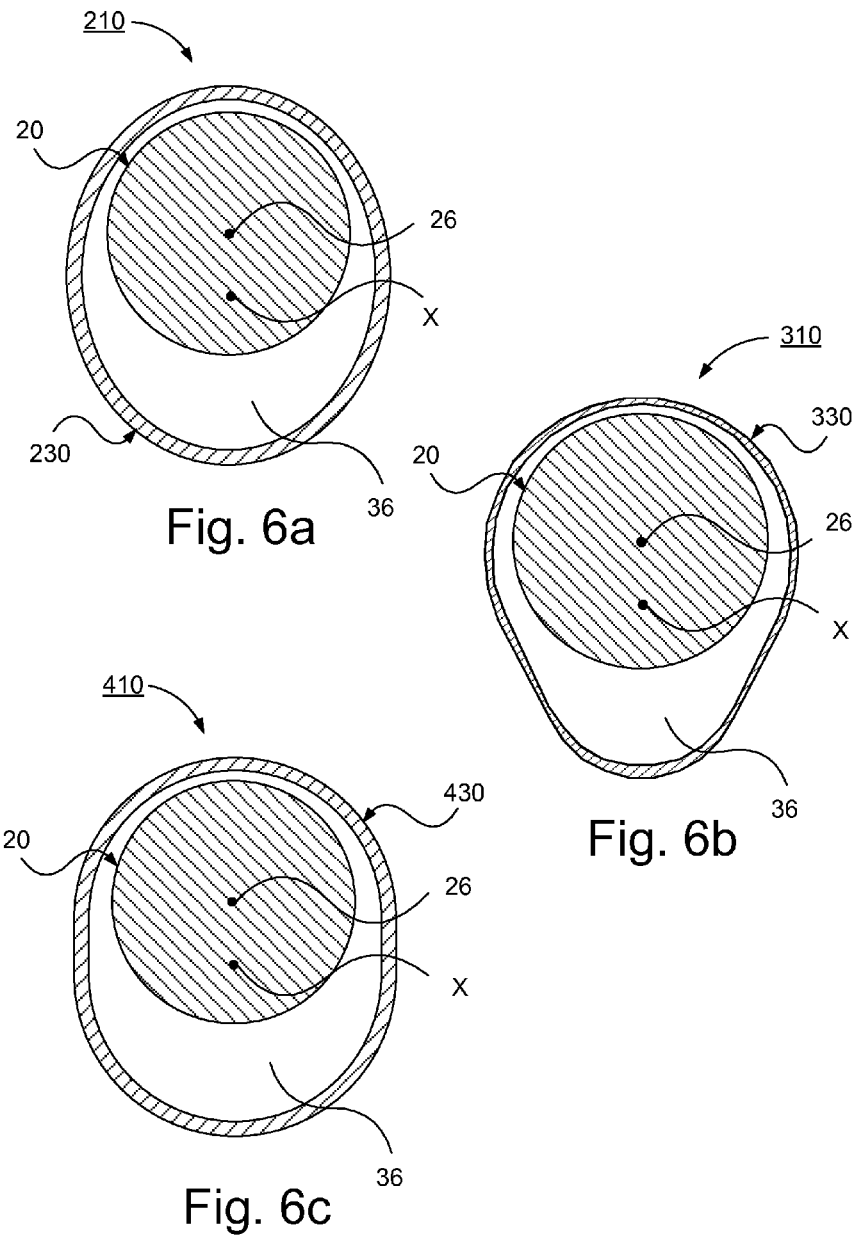

ELECTRIC DRIVE DEVICE FOR MOTOR VEHICLE

CROSS REFERENCE TO RELATED APPLICATIONS

This is a U.S. National Phase patent application of PCT/SE2011/050947, filed Jul. 12, 2011, which claims priority to the Swedish Patent Application No. 1050807-5, filed Jul. 16, 2010, each of which is hereby incorporated by reference in the present disclosure in its entirety.

TECHNICAL FIELD

The invention relates to an electric drive device according to the preamble of claim 1. The invention also relates to a motor vehicle.

BACKGROUND ART

The vehicle industry goes through a phase of change in which the vehicles are electrified to a larger extent, the latest trend being hybridisation of different kinds. High demands are put on compactness and large power and torque outlets.

DE19840006 discloses an electric motor housed in a housing, the centre of rotation of the electric motor being displaced relative to the rotational centre of the drive wheels. The drive shaft of the electric motor is concentric to the housing of the electric motor.

US2007117669 discloses an electric drive device with an electric motor housed in a housing, wherein the output shaft of the electric motor is concentrically arranged relative to the drive shaft of the electric motor. The drive device further comprises a differential motor arranged in connection to the electric motor. The rotational centre of the electric motor is displaced relative to the rotational centre of the drive wheels.

OBJECT OF THE INVENTION

An object of the present invention is to provide an electric drive device for driving of a motor vehicle which facilitates a compact, volume efficient and stable construction.

SUMMARY OF THE INVENTION

This and other objects, apparent from the following description, are achieved by means of an electric drive device and a motor vehicle, which are of the type stated by way of introduction and which in addition exhibits the features recited in the characterising clause of the appended claims 1 and 13. Preferred embodiments of the electric drive device are defined in appended dependent claims 2-12.

According to the invention the object is achieved with an electric drive device for driving of a motor vehicle comprising an electric motor with a stator and a rotor arranged to rotate a drive shaft, a housing in which the electric motor is housed, which housing having an essentially ring shaped cross section with an imaginary centre axle, wherein the electric motor is eccentrically arranged in the housing in such a way that the rotational centre of the drive shaft of the electric motor runs essentially parallel to and at a distance from the centre axel of the housing so as to form a desired space between the electric motor and said housing.

Hereby is facilitated a compact, volume efficient and stable device at the same time as space is set free for e.g. an oil sump and/or differential/differential shaft in the housing. Further it is facilitated to collect connections for lubrication to the oil sump and to facilitate for outlet of cabling out of the housing.

According to an embodiment of the electric drive device said desired space has a valley like configuration.

According to an embodiment of the electric drive device said ring shaped cross section is circular. Hereby a very stable and rigid housing is obtained which also is cheap to manufacture as circular cylindrical tubes may be used for manufacturing of the housing.

According to an embodiment of the electric drive device said ring shaped cross section is elliptic. This results in a stable construction and compact solution.

According to an embodiment of the electric drive device the electric motor is eccentrically displaced in such a way that said space is set free in the housing below the electric motor. By arranging the space below the electric motor application of oil sump is facilitated.

According to an embodiment of the electric drive device an oil sump is arranged in the bottom of the housing in said space. Hereby efficient lubrication of gear wheels/gears and reception of oil cooling medium for cooling of the electric motor is facilitated.

According to an embodiment the electric drive device comprises an output shaft connected to said drive shaft. Hereby connection to drive wheels/hub reduction may be provided for driving of a vehicle.

According to an embodiment of the electric drive device said output shaft is aligned with said drive shaft. Hereby a so called electric motor-in-shaft solution is obtained which results in avoidance of additional forces on housing such as internal cross forces such that only torque and bending forces occur.

According to an embodiment of the electric drive device said output shaft extends through said drive shaft. Hereby a so called electric motor-in-shaft solution is obtained which results in planetary gears/reduction gears being arrangable on the respective side of the electric motor, the sun gear of the respective planetary gear being connected to the output shaft of the respective side of the electric motor.

According to an embodiment the electric drive device further comprises a differential device with an axle configuration arranged in the housing in the space set free between the electric motor and the housing due to the eccentric displacement of the electric motor. Hereby a compact solution with differential device for differential function is obtained, which differential device is connected to planetary gears, wherein efficient drive is facilitated.

According to an embodiment of the electric drive device said housing is configured to receive external loads. Due to the fact that the housing is configured such that external loads, e.g. from the sides via e.g. hub reduction are received in the structure of the housing such loads do not affect planetary configurations or electric motor in the housing.

According to an embodiment of the electric drive device said housing has an opening arranged in the central area along the extension of the housing in the lower portion. Hereby outlet of cabling from the electric motor out of the housing and introduction of lubrication into the housing is facilitated.

DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 1 schematically shows a side view of a motor vehicle;

FIG. 2a schematically shows an axial cross sectional view of an electric drive device according to an embodiment of the present invention;

FIG. 2b schematically shows a view from above of a differential device of the electric drive device in FIG. 2a;

FIG. 3 schematically shows a radial cross sectional view of an electric drive device according to FIG. 2a;

FIG. 4 schematically shows a side view of an electric drive device according to an embodiment of the present invention;

FIG. 5 schematically shows a radial cross sectional view of the electric drive device according to FIG. 4; and FIG. 6a-c schematically show radial cross sectional views of the electric drive device according to alternative embodiments of the present invention.

DETAILED DESCRIPTION OF EMBODIMENTS

With reference to FIG. 1, a side view of a motor vehicle 1 is shown. The vehicle may be a heavy vehicle, such as a construction vehicle or a military vehicle. The vehicle may be a wheeled vehicle or a tracked vehicle. The vehicle may alternatively be a car. The vehicle 1 comprises at least one electric drive device for propulsion of the vehicle according to any of the embodiments below.

FIG. 2a schematically shows an axial cross sectional view of an electric drive device 10 according to an embodiment of the present invention, FIG. 2b a view from above of a differential device 40 of the electric drive device 10 in FIG. 2a and FIG. 3 schematically shows a radial cross sectional view of the electric drive device 10 in FIG. 2a. The electric drive device 10 comprises an electric motor 20 and a housing 30 in which the electric motor 20 is housed. The electric drive device is arranged to impel a motor vehicle.

The electric motor 20 comprises a rotor 22 and a stator 24, said rotor 22 being connected to a drive shaft 26 or rotor shaft 26 and being arranged to rotate said drive shaft 26. The drive shaft 26 is arranged to run concentrically relative to the rotor 22, wherein the rotor 22 is arranged to surround the drive shaft 26. The stator 24 is arranged to surround the rotor 22, wherein the rotor shaft and consequently the rotor 22 are arranged concentrically relative to the stator 24. The electric motor 20 and consequently the drive shaft 26 is according to a variant intended to be arranged across the longitudinal extension of the vehicle, wherein the drive shaft is connected to drive wheels of the vehicle and arranged to drive the same. The drive shaft 26 is arranged to run essentially horizontally. The drive shaft 26 is intended to be connected to and drive ground engaging members such as drive wheels or drive tracks. The electric drive device 10 is consequently arranged to drive ground engaging members such as drive wheels or drive tracks for propulsion of the motor vehicle.

The drive shaft 26 consequently runs concentrically relative to the imaginary centre axle of the electric motor 20. Hereby a desired space 36 between the electric motor and said housing is formed. Said space 36 has a valley like configuration.

The housing 30 has an essentially ring shaped cross section with an imaginary centre axle X. According to this embodiment the housing 30 has an essentially circular cross section. The electric motor 20 is arranged eccentrically displaced relative to the housing 30 in such a way that the drive shaft 26 of the electric motor 20 runs parallel to and at a distance from the centre axle X of the housing 30 for forming of said desired space 36. The housing 30 is consequently intended to be arranged essentially horizontally such that the imagined centre axle X runs essentially horizontally.

The electric motor 20 is displaced mainly radially upwardly in the essentially circular cylindrical housing 30. The housing 30 constitutes a centre part of a supporting structure in the electric drive device 10. According to a variant the displacement of the drive shaft 26/imaginary centre axle 26 relative to the housing 30 is 20-80 mm, according to a variant about 45 mm. Said desired space consequently runs axially in the lower area of the housing 30.

The centimeters gained under the electric motor 20 due to the eccentric placement of the electric motor 20 relative to the drive shaft 26 are used for placement of differential axle configuration 42a, 42b of the differential device 40 and oil sump O. Further is facilitated to take out the cabling from the middle of the housing 30 in a smooth way, which is illustrated in FIGS. 4 and 5 and explained in more detail below.

The electric drive device 10 comprises an output shaft 12 connected to the drive shaft 26. The output shaft 12 is according to this embodiment aligned with the drive shaft 26. The output shaft 12 according to this embodiment extends through said drive shaft 26.

The electric drive device 10 according to this embodiment comprises differential means arranged in the housing 30. Said differential means comprises a first planetary gear configuration 50 and a second planetary gear configuration 60, the electric motor 20 being arranged between said first and second planetary gear configuration 50, 60.

The first planetary gear configuration 50 comprises planet gears 52, a sun gear 54, and a ring gear 56. The second planetary gear configuration 60 comprises planet gears 62, a sun gear 64, and a ring gear 66.

The first and second planetary gear configuration 50, 60 are drivably connected to each other via said output shaft 12. The output shaft 12 is connected to the sun gear 54, 64 of the respective planetary gear configuration 50, 60.

The differential means comprises the differential device 40 engaged to the ring gear 56 of the first planetary gear configuration 50 and the ring gear 66 of the second planetary gear configuration 60 for providing of differential function of a motor vehicle.

The differential device 40 comprises an axle configuration 42a, 42b which is arranged in the housing 30 between electric motor and wall of housing wall of the housing 30 in the space 36 being set free by said displacement of the centre axle 26 of the electric motor 20 relative to the centre axle X of the housing 30.

As can be seen from FIG. 2b the axle configuration comprises a first differential shaft 42a and a second differential shaft 42b which run essentially parallel to each other along the axial longitudinal extension of the housing in the space 36. The differential device comprises differential gears 44a, 44b, 46a, 46b, wherein the gear 44a on the first differential shaft 42a is engaged by teeth to the ring gear 56 and the gear 44b on the first differential shaft 42b is engaged by teeth to the ring wheel 66.

The differential device 40 is arranged to gear up the output shaft 12 on one side at the same time as the other side is geared down which is obtained in that the ring gears 56, 66 are allowed to rotate in opposite direction to each other by means of the gears 46a, 46b.

The electric motor 20 of the electric drive device 10 is axially aligned with the output shaft 12 and axle configuration 42 of the differential device 40 is arranged to run along the jacket surface of the electric motor 20 in the space 36 in the housing 30 set free through the displacement of the centre axle of the electric motor 20 relative to the centre axle of the housing 30.

The housing comprises radially running wall portions 32, 34 schematically shown in FIG. 2a, arranged to constitute partitions between the planetary gear configurations 50, 60 and the electric motor 20. Theses wall portions 32, 34 are required for suspension of rotor shaft and ring gears among others.

The electric drive device 10 is intended to provide high output torques and having high output rotational speed. According to a variant the electric drive device comprising hub reductions 10, not shown, arranged to provide output torque in the range of 200 kNm, for the electric drive unit apart from the hub reduction the corresponding torque is in the range of 10 kNm, according to this embodiment, and to have a maximum output rotational speed closer to 100 rpm, for the electric drive unit apart from hub reduction the corresponding rotational speed is closer to 2000 rpm.

The housing 30 is configured to be load carrying and constructed to withstand heavy loads, according to a variant loads in the range of 200 tonnes. The housing 30 is arranged to support external loads. The housing 30 is configured such that external loads, e.g. from the sides via e.g. hub reduction are transferred into the structure of the housing such that such loads do not affect the planetary gear configuration or electric motor. The housing 30 is arranged to receive driving torque from the electric motor 20. Such loads comprise loads arisen during drive of the electric drive device 10, loads from above etc.

Above said values are only examples and any suitable electric drive device may be used depending on application.

By using a cylindrical housing 30 with a circular cross section a rigid housing 30 which is easy and cheap to manufacture is obtained. According to an embodiment the construction element for the housing 30 is constituted by a tube with a circular cross section which is optimal for receiving loads. By arranging the electric motor 20 eccentrically in such a horizontally arranged housing 30, volume uppermost in the housing 30 is utilized, i.e. the electric motor is arranged such that its upper jacket surface runs axially along the internal upper surface of the housing 30, at the same time as the axle configuration of the differential device is arranged below the electric motor 20 in the space 36 being set free, i.e. the axle configuration is arranged such that it runs axially in the space 36 along the internal lower surface of the housing 30, wherein a compact construction is obtained, at the same time as a circular cylindrical tube is utilized with the above mentioned advantages.

The invention is to let the electric motor 20 be eccentrically located in the circular cylindrical housing 30 arranged horizontally in a vehicle, i.e. the rotational centre of the drive shaft 26 is radially displaced relative to the imagined centre axle X of the circular cylindrical housing 30, wherein space is given to the axle configuration 42a, 42b of the differential device 40 in the housing 30 in the axially running space 36 below the electric motor 20. The volume being available when the electric motor 20 is displaced is utilized as oil sump O and provides as mentioned space for the axle configuration 42a, 42b of the differential device 40 and consequently also a differential brake/torque-vectoring, not shown. Further, the space 36 set free facilitates for collecting connections for lubrication, cooling means, power supply and sensors etc.

Due to the fact that the output shaft extends through said drive shaft, a motor-in-shaft solution with output shaft 12 via planetary gear configuration 50, 60 on the respective side of the electric motor 20 is obtained. A motor-in-shaft solution does not require any cardan shafts, but instead all power transfer is effected via cable. Specifically for the variant according to this embodiment with electric motor 20 eccentrically arranged in the housing 30 with a circular cross section a compact and volume efficient device is obtained, at the same time as the housing 30 maintains a circular cylindrical shape for best strength and rigidity.

The electrical drive device 10 according to the present invention is intended firstly for medium sized and heavy special vehicles. Hereby the electric motor 20 is horizontally located in the vehicle and eccentrically located relative to the circular cylindrical housing 30 horizontally arranged in the vehicle, wherein at the same time coaxiality is maintained between drive shaft and output shaft and consequently drive wheels.

FIG. 4 schematically shows a side view of an electric drive device 110 according to an embodiment of the present invention and FIG. 5 schematically shows a radial cross sectional view of the electric drive device 10 according to FIG. 4.

The electric drive device 110 according to this embodiment differs from the electric drive device 10 according to the embodiment in FIG. 2-3 only in that the housing 130 has an opening 114 formed through a port 112 arranged in the centre area along a side of the housing 130 in the lower portion such that cabling from the electric motor may be guided out of the housing 130.

Due to the fact the electric motor 20 is eccentrically arranged outlet of cabling by arranging said port 112 in the lower portion of the housing 130. Further, according to an embodiment said port is also arranged to constitute connection to lubrication means.

FIG. 6a-c schematically shows radial cross sectional views of an electric drive device 210; 310; 410 according to alternative embodiments of the present invention, the housing 230; 330; 430 having different ring shaped cross sections.

Above an electric drive device 10; 110 with a housing 30; 130 for housing an electric motor 20, where the housing 30; 130 has an essentially circular cross section with an imaginary centre axle X has been described.

According to an alternative embodiment illustrated in FIG. 6a the electric drive device 210 has a housing 230 with an essentially elliptic cross section with a centre axle X, wherein the electric motor 20 is arranged eccentrically displaced in the housing 230 in such a way that the drive shaft 26/centre axle 26 of the electric motor 20 runs parallel to and at a distance from the centre axle of the housing 230.

According to an alternative embodiment the electric drive device 310 has a housing 330 with an essentially egg shaped cross section with a centre axle X, wherein the electric motor 20 is arranged eccentrically displaced in the housing 330 in such a way that the drive shaft 26/centre axle 26 of the electric motor 20 runs parallel to and at a distance from the centre axle X of the housing 330.

According to an alternative embodiment the electric drive device 410 has a housing 430 with an essentially elongated cross section with parallel sides and semi-circular ends with a centre axle X, wherein the electric motor 20 is arranged eccentrically displaced in the housing 430 in such a way that the drive shaft 26/centre axle 26 of the electric motor 20 runs parallel to and at a distance from the centre axle of the housing 30.

Above an electric drive device with a ring shaped housing and an electric motor eccentrically located in the housing, the ring shaped housing being intended to be arranged essentially horizontally across the longitudinal extension of the vehicle such that the drive shaft of the electric motor for propulsion of the vehicle runs across the longitudinal extension of the vehicle for driving of ground engaging members such as drive wheels or drive tracks has been described.

Alternatively the ring shaped housing of the electric drive device with ring shaped housing and electric motor eccentrically located in the housing intended to be arranged essentially horizontally in the longitudinal extension of the vehicle such that the drive shaft of the electric motor for propulsion of the vehicle runs in the longitudinal direction of the vehicle, wherein a cardan shaft is arranged for transferring of drive power from the drive shaft to ground engaging drive wheels or drive tracks.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An electric drive device being arranged for driving a motor vehicle, the electric drive device comprising:
    an electric motor with a stator and a rotor arranged to rotate a drive shaft for driving the motor vehicle; and
    a housing in which the electric motor is housed, the housing having an essentially ring shaped cross section with an imaginary centre axle,
    wherein the drive shaft runs essentially horizontally with respect to the motor vehicle, and
    wherein the electric motor is eccentrically arranged in the housing in such a way that the rotational centre of the drive shaft of the electric motor runs essentially parallel to and at a distance from the centre axle of the housing so as to form a desired space between the electric motor and said housing.

2. An electric drive device according to claim 1, wherein said desired space has a valley like configuration.

3. An electric drive device according to claim 1, wherein said ring shaped cross section is circular.

4. An electric drive device according to claim 1, wherein said ring shaped cross section is elliptic.

5. An electric drive device according to claim 1, wherein the electric motor is eccentrically displaced in such a way that said space is set free in the housing below the electric motor.

6. An electric drive device according to claim 1, wherein an oil sump is arranged in the bottom of the housing.

7. An electric drive device according to claim 1, comprising an output shaft connected to said drive shaft.

8. An electric drive device according to claim 7, wherein said output shaft is aligned with said drive shaft.

9. An electric drive device according to claim 7, wherein said output shaft extends through said drive shaft.

10. An electric drive device according to claim 1, further comprising a differential device with an axle configuration arranged in the housing in the space set free between the electric motor and housing by the eccentric displacement of the electric motor.

11. An electric drive device according to claim 1, wherein said housing is configured to receive external loads.

12. An electric drive device according to claim 1, wherein said housing has an opening arranged in the centre area along the extension of the housing in the lower portion.

13. A motor vehicle comprising an electric drive device according to claim 1.

* * * * *